UNITED STATES PATENT OFFICE.

EDWIN GLOOR, OF WEBSTER GROVES, AND WILLIAM W. PASCAL, OF ST. LOUIS, MISSOURI, ASSIGNORS TO COMMONWEALTH FEED MILLS COMPANY, OF ST. LOUIS, MISSOURI, A CORPORATION OF MISSOURI.

ALFALFA FEED MIXTURE.

969,267. Specification of Letters Patent. Patented Sept. 6, 1910.

No Drawing. Application filed December 20, 1909. Serial No. 534,120.

*To all whom it may concern:*

Be it known that we, EDWIN GLOOR and WILLIAM W. PASCAL, both citizens of the United States, residing at Webster Groves, Missouri, and St. Louis, Missouri, respectively, have invented a certain new and useful Improvement in Alfalfa Feed Mixture, of which the following is a full, clear, and exact description, such as will enable others skilled in the art to which it appertains to make and use the same.

This invention relates to a feed mixture for horses, mules, and cattle.

One object of our invention is to provide a feed mixture that contains shredded alfalfa and also substances that neutralize the laxative tendency of alfalfa. And another object is to provide an alfalfa feed mixture that contains a sufficient quantity of roughage and fatty substances to produce a balanced ration.

Our improved feed mixture is composed of the following substances or ingredients: shredded alfalfa, cracked corn, whole oats, salt, and a suitable roughage, preferably peanut meal.

The ingredients above-mentioned are preferably mixed in about the following proportions as we have found that such proportions produce a perfectly balanced ration for horses, mules and cattle: 30% of shredded alfalfa; 40% of cracked corn; 15% of whole oats; 15% of peanut meal; $\frac{1}{3}$ of 1% of salt.

The peanut meal is composed of ground peanuts and peanut shells, and the function of said meal is to supply the necessary fat and roughage to the mixture and also neutralize the laxative tendency of the alfalfa.

Having thus described our invention, what we claim as new and desire to secure by Letters Patent is:

A feed mixture comprising a composition containing thirty per cent. of shredded alfalfa, forty per cent. of cracked corn, fifteen per cent. of whole oats, fifteen per cent. of peanut meal, and a small quantity of salt.

In testimony whereof, we hereunto affix our signatures, in the presence of two witnesses, this 17th day of December, 1909.

EDWIN GLOOR.
WILLIAM W. PASCAL.

Witnesses:
J. Z. TOENISKOETTER,
LOUIS TOENISKOETTER.